United States Patent Office 3,488,072
Patented Jan. 6, 1970

3,488,072
QUICK DISCONNECT PIPE COUPLING
Chester Allen, Kenneth L. Furnatter, and Harry Pierkowski, Little Rock, Ark., assignors to A. O. Smith Corporation, Milwaukee, Wis., a corporation of New York
Filed July 10, 1968, Ser. No. 743,785
Int. Cl. F16l 19/00, 33/18
U.S. Cl. 285—353                           1 Claim

ABSTRACT OF THE DISCLOSURE

A four-part rapid disconnect pipe coupling, particularly adapted for fiber glass reinforced plastic pipe. The coupling includes an O-ring seal which is confined under compression against the outer pipe surface adjacent one end of the two pipe sections, which are held together by means of a threaded collar. The collar fits over a plain shoulder of one of the pipe sections and is threaded onto a threaded shoulder on the other pipe section, thereby confining and compressing the O-ring seal between the inner surface of the threaded collar, the outer surface of one of the pipe sections and the adjacent end edges of the plain pipe shoulder and the threaded pipe shoulder.

BACKGROUND OF THE INVENTION

Many pipe couplings have been developed to provide a sealed union between adjacent pipe sections which are rapidly assembled and readily disconnected. Some of these fluid-tight couplings are relatively complicated. See, for example, the couplings shown in U.S. Patents 2,933,333, 2,978,262 and British Patent 745,847. Each of the above patents is faced with the problem of providing a fluid-tight seal which is readily disconnectable, and each patent shows a different construction for accomplishing this goal.

U.S. Patent 2,933,333 is further complicated by the requirement that the coupling be added to a line under pressure, and a thin metallic diaphragm 35 is included which is cut open during assembly of the coupling. U.S. Patent 2,978,262 does show a fitting for coupling to a thermoplastic tube which could be considered of the bell and spigot type, but the end of the thermoplastic tube is compressed and deformed as the coupling is tightened, and it would not appear that this tube could be disconnected and reconnected without first cutting away the deformed portion of the thermoplastic tube.

British Patent 745,847 shows a coupling for plastic pipes which includes a complementary pair of abutting flanges 12 and 16 having a modified bell and spigot seal therebetween. Metal rings 13 and 17 are provided on the back edges of the flanges 12 and 16 to give rigid annular support to the coupling. The flanges are held together by means of a pair of complementary threaded collars 10 and 14.

More recently, U.S. Patent 3,352,577 proposed a coupling for filament reinforced thermosetting resin tubular members which includes a pair of abutting annular frusto-conical members 19 and 21. Seals 41 may be provided in recesses in the outer surfaces of members 19 and 21, or a resilient gasket 53 may be disposed between the abutting edges of the members 19 and 21. Collar members 23, 25 and 47, 49 and 51 are used to hold the coupling assembly together. The seals 41 serve only a limited purpose, and the seal 53 is merely pressed against the abutting surfaces of the frusto-conical members 19 and 21. Such designs as those described above are complicated, expensive to fabricate and, in some cases, parts must be modified or replaced if the coupling is disassembled and reassembled.

SUMMARY OF THE INVENTION

Applicants' coupling is relatively simple, comprising only four parts including the seal. The fitting can be readily assembled, disassembled, and reassembled with relatively little effort, and no modification or replacement of parts. In addition, the seal is assembled in such a way that it always provides a positive, compressed and confined fluid-tight seal. The adjacent pipe ends are provided with integral shoulders, one of which extends out beyond the pipe end and the other which is spaced back from its pipe end so that the two pipe ends come together in a bell and spigot joint. One of the shoulders is externally threaded to receive an internally threaded, slidable collar thereon. The O-ring seal is disposed around the spigot end of the coupling and is compressed between the shoulders on the pipe surface to provide a fluid-tight seal between the pipe sections.

DESCRIPTION OF THE PREFERRED EMBODIMENTS

Figure 1:
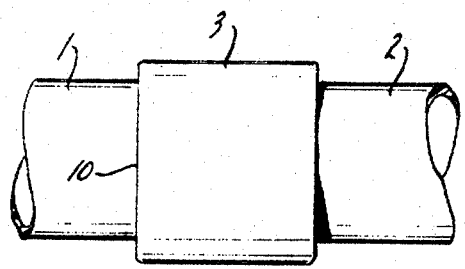
FIG. 1 is a side plan view, with parts broken away, of the assembled coupling.
Figure 2:
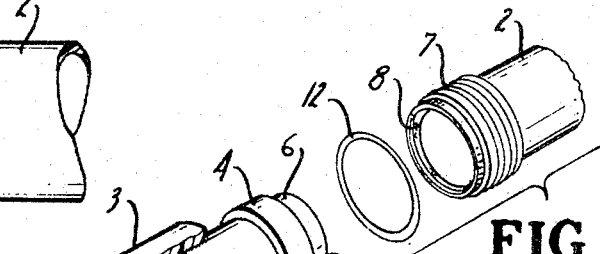
FIG. 2 is an exploded perspective view with parts broken away and in section of the coupling.
Figure 3:
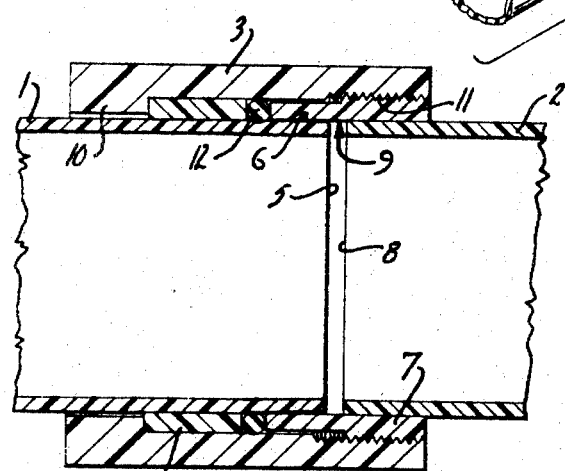
FIG. 3 is a side sectional view with parts broken away of the assembled coupling shown in FIG. 2.
Figure 5:
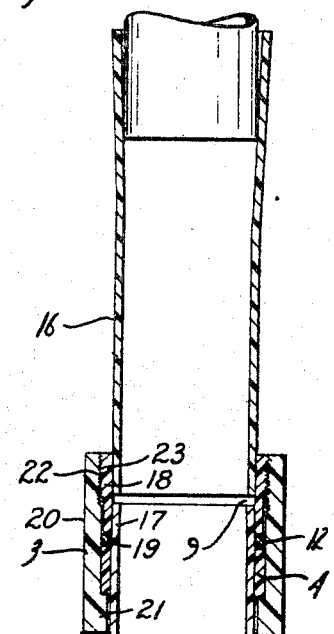
FIG. 5 is a view similar to FIG. 3, but showing two bells coupled together.

Basically, the coupling includes a first pipe 1 and a second pipe 2 held together by a slidable collar 3. Pipe 1 includes an integral shoulder ring 4 which is spaced back a predetermined distance from end 5 of the pipe 1, thereby defining a stepped spigot 6, when viewed from the side. The second pipe 2 includes a second, integral shoulder ring 7 which extends outwardly from end 8 of the second pipe 2 to define a bell 9 which may be telescoped over the spigot 6. As seen in FIG. 3, one end of the slidable collar 3 includes an interior shoulder 10 which fits against the integral shoulder ring 4 of the first pipe 1. The other end of the collar 3 is internally threaded and threads onto an externally threaded portion of the second integral shoulder ring 7, as at 11.

An annular O-ring seal 12 is disposed around the spigot 6 of the first pipe 1 immediately contiguous to end face of the integral shoulder ring 4. The end face of the integral shoulder ring 7 of the second pipe 2 also contacts the opposed side of O-ring seal 12. As the collar 3 is threaded onto the shoulder ring 7, the pipes 1 and 2 are drawn together, and the O-ring seal 12 is confined and compressed between adjacent peripheral surfaces and respective end faces of spigot 6 and bell 9, thereby providing an easily disassembled, fluid-tight coupling.

Figure 4:
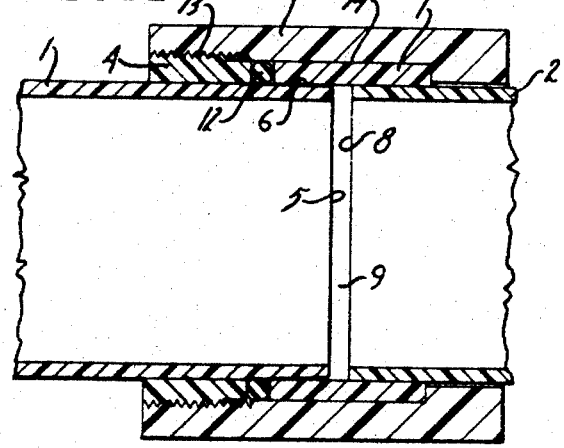
FIG. 4 is a view similar to FIG. 3 of another embodiment of the coupling.

FIG. 4 shows a second embodiment of the invention, in which the first integral shoulder ring 4 is provided with external threads 13, and the collar 3 is assembled reversely to the assembly shown in FIG. 3. The second shoulder ring 7 of the second pipe 2 has a plain external surface 14 in the embodiment of FIG. 4. Otherwise, the mechanics of the assembly are similar. When collar 3 is threaded onto the ring 4 of the first pipe 1, the O-ring seal 12 is confined and compressed in the manner described above.

Although other materials can be used to fabricate the pipe coupling of the subject invention, it is contemplated that a filament wound epoxy resin impregnated laminate can be used. The shoulder ring 4 is formed by winding a resin impregnated filament around a suitable mandrel, cured and then bonded to the first pipe 1 near the end 5 but leaving an end portion exposed to define the spigot 6.

The collar 3 is also fabricated from filament wound epoxy resin impregnated laminates. The inner diameter Jan. 6, 1970  C. ALLEN ET AL  3,488,072
QUICK DISCONNECT PIPE COUPLING
Filed July 10, 1968

INVENTORS
CHESTER ALLEN
KENNETH L. FURNATTER
HARRY PIERKOWSKI
BY
Andrus, Sceales, Starke & Sawall
Attorneys